United States Patent
Jung et al.

(10) Patent No.: US 8,973,768 B1
(45) Date of Patent: Mar. 10, 2015

(54) GANTRY ROBOT SYSTEM

(75) Inventors: Thomas E. Jung, Welch, MN (US); Thomas E. Marrinan, Minneapolis, MN (US); Come Rene-Bazin De Jouy, Minneapolis, MN (US)

(73) Assignee: PaR Systems, Inc., Shoreview, MN (US)

( * ) Notice: Subject to any disclaimer, the term of this patent is extended or adjusted under 35 U.S.C. 154(b) by 975 days.

(21) Appl. No.: 12/900,934

(22) Filed: Oct. 8, 2010

Related U.S. Application Data

(60) Provisional application No. 61/266,374, filed on Dec. 3, 2009, provisional application No. 61/250,285, filed on Oct. 9, 2009.

(51) Int. Cl.
*B25J 5/04* (2006.01)
*B25J 9/02* (2006.01)
*B66C 9/16* (2006.01)

(52) U.S. Cl.
CPC .. *B25J 9/026* (2013.01); *B66C 9/16* (2013.01); *Y10S 901/16* (2013.01)
USPC ........... 212/312; 414/626; 414/751.1; 901/16

(58) Field of Classification Search
CPC ....... B23Q 1/4852; B23Q 1/603; B25J 9/026; B25J 9/106; B25J 9/1065; B25J 9/107; B25J 17/0233; B66C 11/00; B66C 11/06; B66C 17/00; B66C 17/04; B66C 2700/01; B66C 2700/012; B66C 2700/014; B66C 2700/015; B66C 2700/018; B66C 5/02; B66C 5/04; B66C 5/06; B66C 7/00; B66C 7/02; B66C 7/04
USPC .............. 104/94, 95; 212/271, 312, 320, 321, 212/322; 414/225.01, 626, 744.8, 751.1; 901/16, 28, 29
See application file for complete search history.

(56) References Cited

U.S. PATENT DOCUMENTS

| | | | | |
|---|---|---|---|---|
| 1,752,026 A * | 3/1930 | Phillips | ...................... | 105/163.1 |
| 2,416,352 A * | 2/1947 | Seward | ........................ | 104/107 |
| 4,245,548 A * | 1/1981 | Blatt | ................................ | 92/5 R |
| 4,655,594 A * | 4/1987 | Wittekoek et al. | ............. | 356/500 |
| 4,836,111 A * | 6/1989 | Kaufmann | ...................... | 104/89 |
| 5,378,282 A * | 1/1995 | Pollard | .......................... | 118/697 |
| 6,073,551 A * | 6/2000 | Dangelmayr et al. | ........ | 100/207 |
| 6,428,267 B1 * | 8/2002 | Terpstra | ..................... | 414/749.6 |
| 6,557,235 B1 * | 5/2003 | Katz et al. | ........................ | 29/563 |
| 6,582,168 B2 * | 6/2003 | Hogl et al. | ..................... | 409/190 |
| 6,635,887 B2 * | 10/2003 | Kwan et al. | ................. | 250/491.1 |
| 6,715,981 B1 * | 4/2004 | Harsch et al. | .............. | 414/752.1 |
| 6,852,989 B2 * | 2/2005 | Kwan et al. | ................. | 250/491.1 |
| 7,644,558 B1 * | 1/2010 | Fallas | ............................... | 53/251 |
| 7,707,907 B2 * | 5/2010 | Bonev | ........................ | 74/490.08 |
| 7,850,026 B2 * | 12/2010 | McKay | ........................ | 212/315 |
| 8,104,752 B2 * | 1/2012 | Eidelberg | ........................ | 269/60 |

(Continued)

FOREIGN PATENT DOCUMENTS

| | | | | |
|---|---|---|---|---|
| DE | 102006038505 A1 * | 2/2008 | ............. | B65G 47/90 |
| WO | WO 2009069153 A1 * | 6/2009 | ................ | B25J 9/02 |

*Primary Examiner* — Saul Rodriguez
*Assistant Examiner* — Brendan Tighe
(74) *Attorney, Agent, or Firm* — Steven M. Koehler; Westman, Champlin & Koehler, P.A.

(57) ABSTRACT

A gantry robot system includes a bridge assembly and a carriage assembly. The bridge assembly and/or a mounting plate supported by the carriage assembly can be rotationally skewed.

20 Claims, 9 Drawing Sheets

(56) References Cited

U.S. PATENT DOCUMENTS

| | | | |
|---|---|---|---|
| 8,132,662 B1* | 3/2012 | Chen | 198/468.9 |
| 8,303,238 B2* | 11/2012 | Thurneysen et al. | 414/680 |
| 8,348,590 B2* | 1/2013 | Knobel | 414/729 |
| 8,440,932 B2* | 5/2013 | Battheu | 219/121.67 |
| 2001/0006595 A1* | 7/2001 | Hogl et al. | 409/206 |
| 2004/0052628 A1* | 3/2004 | Thurneysen et al. | 414/699 |
| 2004/0123694 A1* | 7/2004 | Negri | 74/490.01 |
| 2004/0238473 A1* | 12/2004 | McKay | 212/315 |
| 2005/0135916 A1* | 6/2005 | Wakaizumi | 414/744.3 |
| 2008/0229860 A1* | 9/2008 | Bonev | 74/479.01 |
| 2009/0041569 A1* | 2/2009 | Bellante | 414/591 |
| 2009/0088912 A1* | 4/2009 | Rajaraman | 701/19 |
| 2010/0047051 A1* | 2/2010 | Knobel | 414/751.1 |
| 2010/0307278 A1* | 12/2010 | Mignano | 74/490.03 |
| 2011/0017714 A1* | 1/2011 | Battheu | 219/121.67 |
| 2012/0048685 A1* | 3/2012 | Chen | 198/750.1 |
| 2013/0183128 A1* | 7/2013 | Knobel | 414/729 |

* cited by examiner

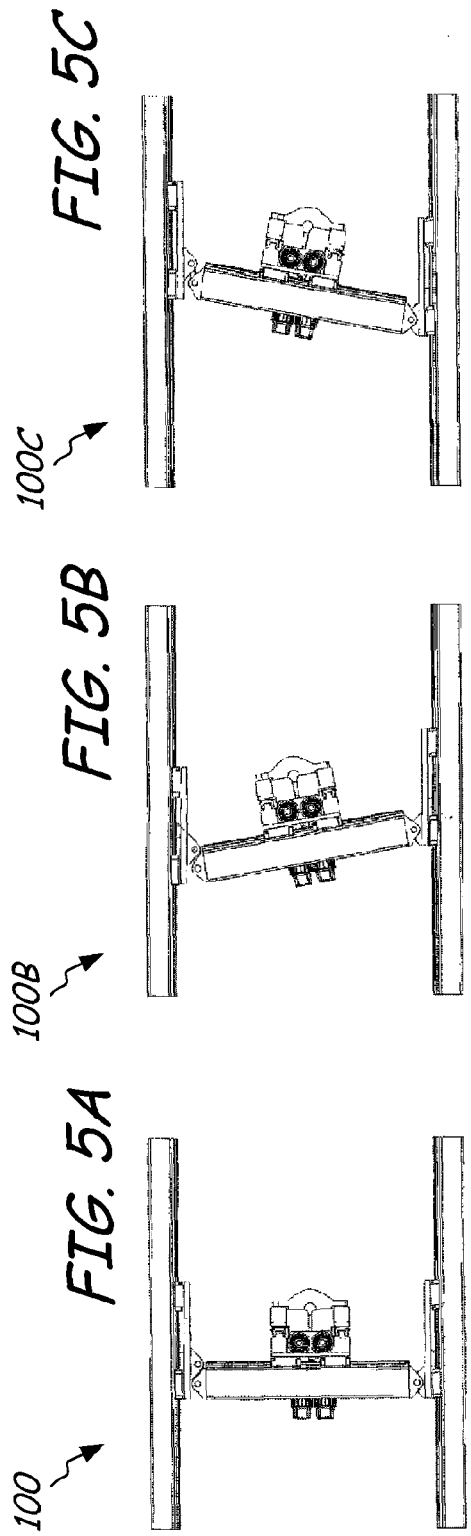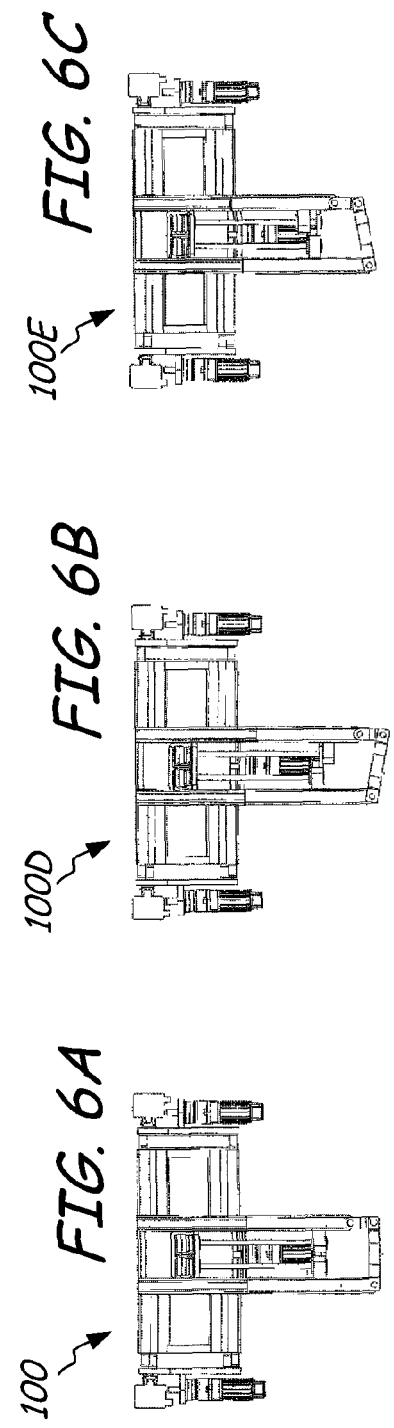

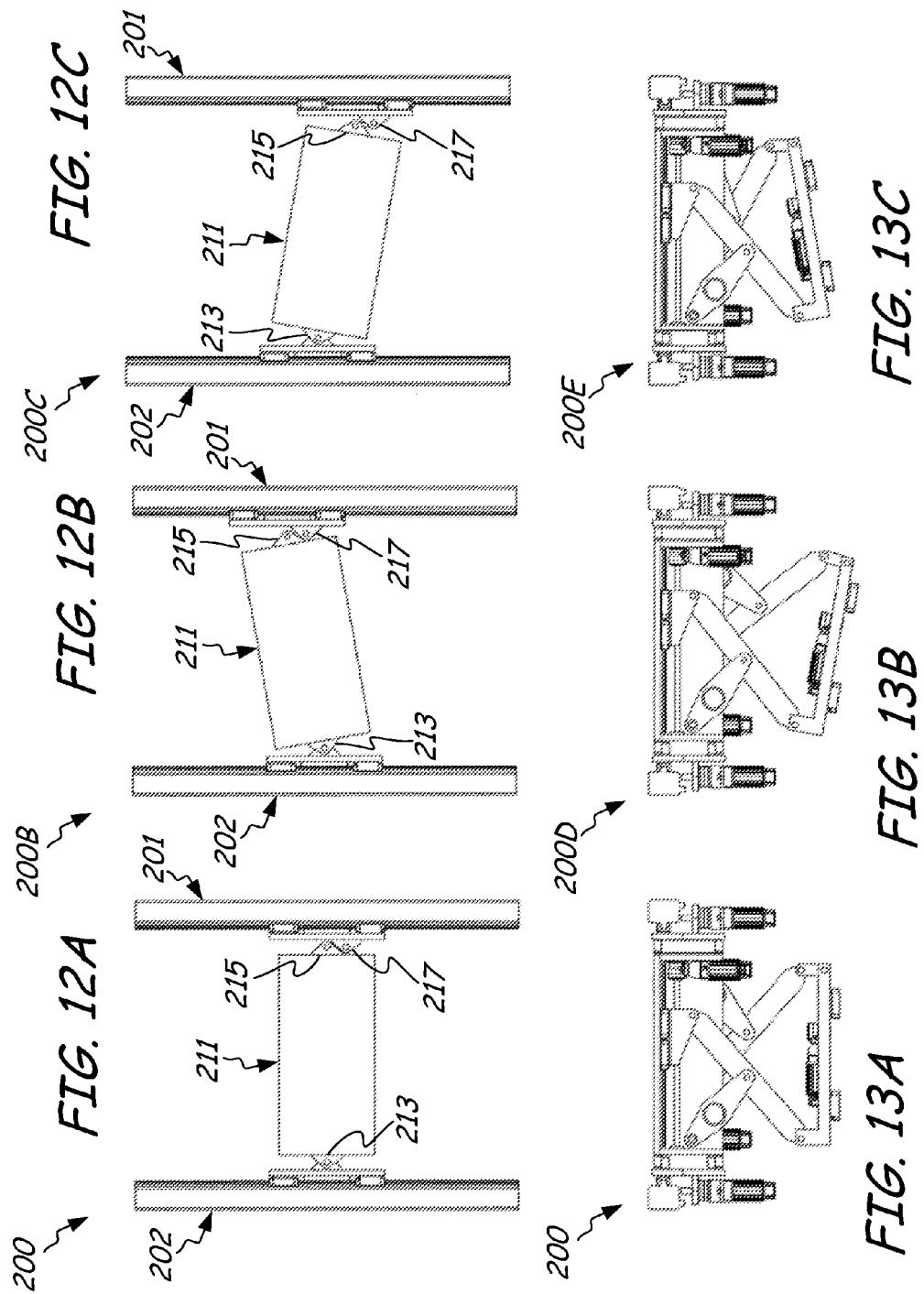

GANTRY ROBOT SYSTEM

CROSS-REFERENCE TO RELATED APPLICATIONS

The present application claims the benefit of U.S. Provisional Patent Application No. 61/250,285, filed Oct. 9, 2009 and U.S. Provisional Patent Application No. 61/266,374, filed Dec. 3, 2009, both of which are hereby incorporated by reference in their entirety.

BACKGROUND

The discussion below is merely provided for general background information and is not intended to be used as an aid in determining the scope of the claimed subject matter.

Handling and manipulating large, heavy, and sensitive items with highly precise control and extremely robust assurance of safe handling poses a substantial challenge. This is particularly true of a system that is capable of both a plurality of translational axes of motion and a plurality of rotational axes of motion.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Aspects of the present invention include a gantry robot system having one or more features herein described and/or depicted. Generally, a gantry robot system includes a bridge assembly and a carriage assembly. The bridge assembly and/or a mounting plate carried by the carriage assembly can be rotationally skewed.

According to one aspect and one illustrative embodiment thereof, a gantry robot system includes a bridge assembly and a carriage assembly. The bridge assembly includes a bridge, a first connector and a second connector connected to the bridge, a first drive connected to the first connector, and a second drive connected to the second connector. The carriage assembly is suspended from the bridge. At least one of the first connector and/or the second connector is an extendible connector, and the first drive and the second drive are independently actuable, thereby enabling the bridge to be rotationally skewed.

According to another aspect, with or without a skewable bridge, the carriage assembly includes a first vertical beam and a second vertical beam. A mast assembly includes a first mast tube connected to a first mast assembly drive that is translatably engaged with the first vertical beam, while a second mast tube is connected to a second mast assembly drive that is translatably engaged with the second vertical beam. An effector plate is connected to the first mast tube by a first mast hinge, and connected to the second mast tube by an extendible set of dual, serially connected mast hinges. The first and second mast assembly drives are independently actuable such that differential inputs to the first and second mast assembly drives engage a vertically rotational skewing of the effector plate.

In yet another aspect a carriage assembly is coupled to and supported by, for example, first and second longitudinal beams. The carriage assembly supports an end effector plate and includes first and second carriage assembly drives and first and second diagonal links, where the first and second carriage assembly drives are independently actuable. The first diagonal link is rotatably engaged at a proximal end thereof with the first carriage assembly drive and at a distal end thereof with the end effector plate. The second diagonal link is also rotatably engaged at a proximal end thereof with the second carriage assembly drive and at a distal end thereof with the end effector plate. Selective actuation of the first and second carriage assembly drives causes vertical displacement and/or rotational skewing of the effector plate about a longitudinal axis.

BRIEF DESCRIPTION OF THE DRAWINGS

FIG. 5A is a top plan view of a gantry robot system in a neutral longitudinal skew position, according to one illustrative embodiment.

FIG. 5B is a top plan view of a gantry robot system in a negative longitudinal skew position, according to one illustrative embodiment.

FIG. 5C is a top plan view of a gantry robot system in a positive longitudinal skew position, according to one illustrative embodiment.

FIG. 6A is a front elevational view of a gantry robot system in a neutral vertical skew position, according to one illustrative embodiment.

FIG. 6B is a front elevational view of a gantry robot system in a positive vertical skew position, according to one illustrative embodiment.

FIG. 6C is a front elevational view of a gantry robot system in a negative vertical skew position, according to one illustrative embodiment.

FIG. 12A is a top plan view of a gantry robot system in a neutral longitudinal skew position, according to the second illustrative embodiment.

FIG. 12B is a top plan view of a gantry robot system in a negative longitudinal skew position, according to the second illustrative embodiment.

FIG. 12C is a top plan view of a gantry robot system in a positive longitudinal skew position, according to the second illustrative embodiment.

FIG. 13A is a front elevational view of a gantry robot system in a neutral vertical skew position, according to the second illustrative embodiment.

FIG. 13B is a front elevational view of a gantry robot system in a positive vertical skew position, according to the second illustrative embodiment.

FIG. 13C is a front elevational view of a gantry robot system in a negative vertical skew position, according to the second illustrative embodiment.

DETAILED DESCRIPTION OF ILLUSTRATIVE EMBODIMENTS

Figure 1:
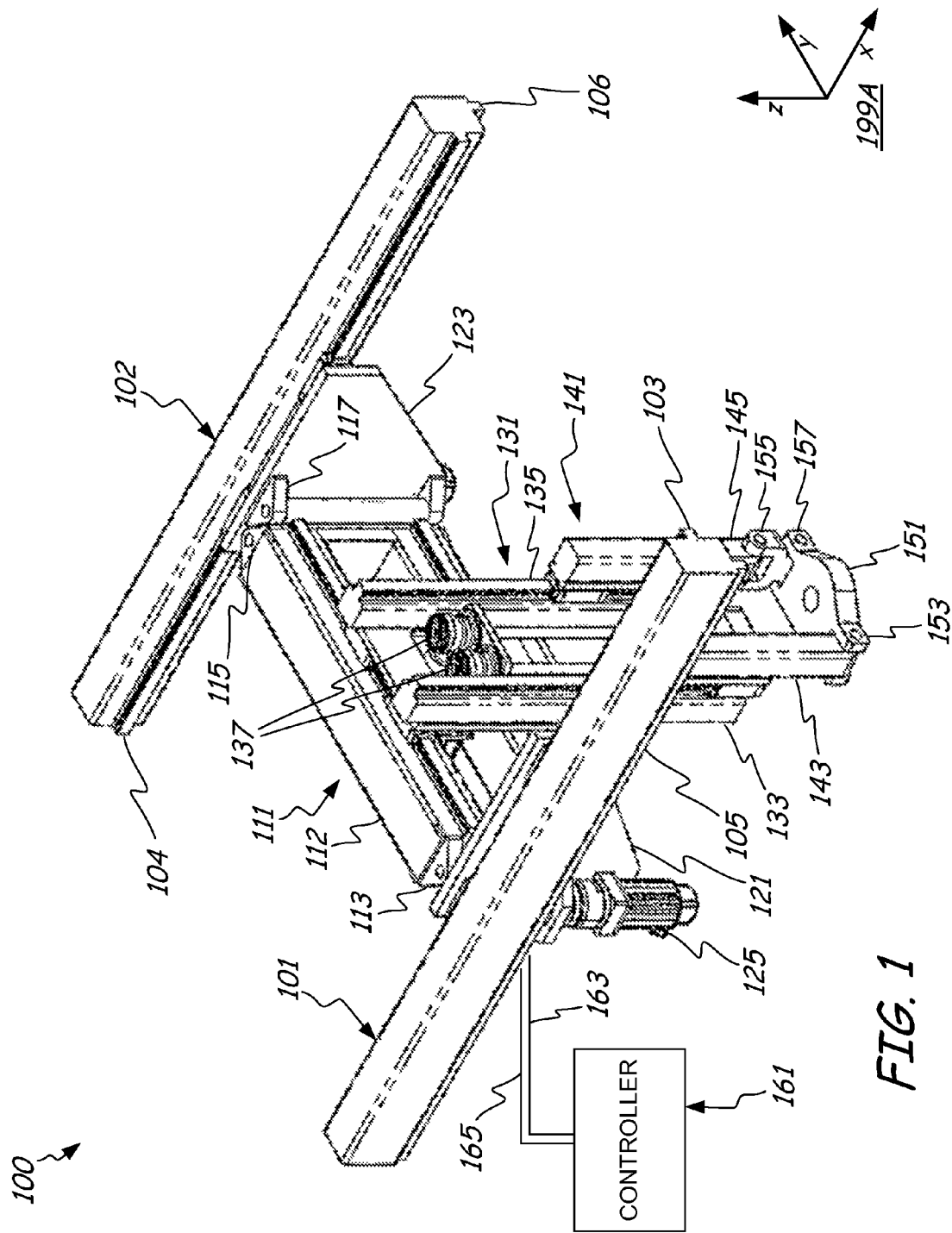
FIG. 1 is a perspective view of a gantry robot system, according to one illustrative embodiment.
Figure 2:
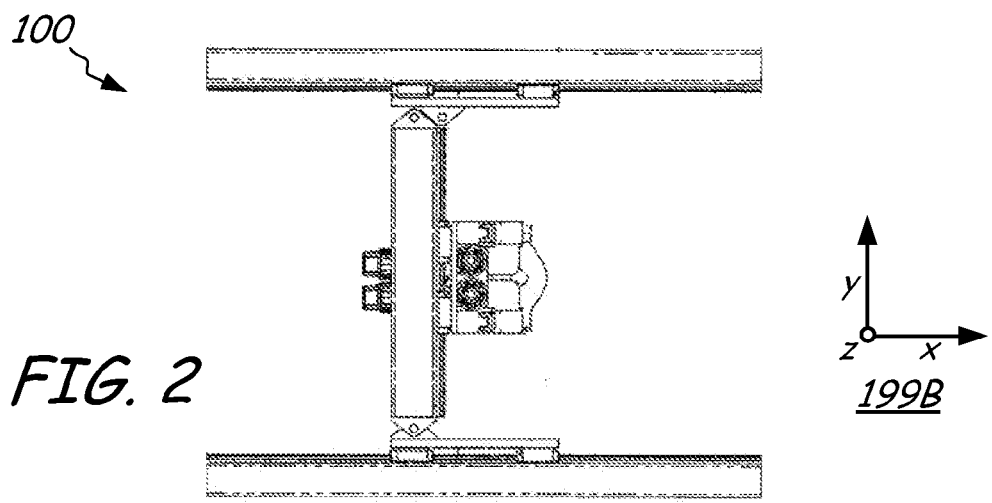
FIG. 2 is a top plan view of a gantry robot system, according to one illustrative embodiment.
Figure 3:
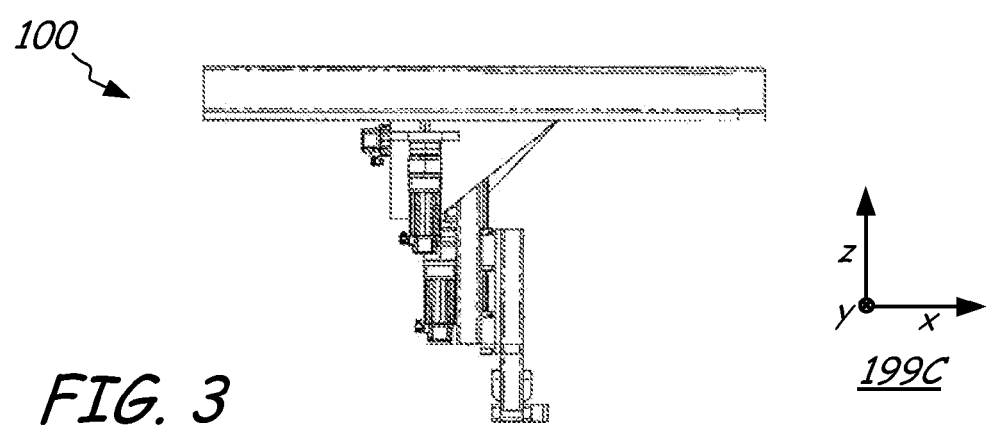
FIG. 3 is a side elevational view of a gantry robot system, according to one illustrative embodiment.
Figure 4:
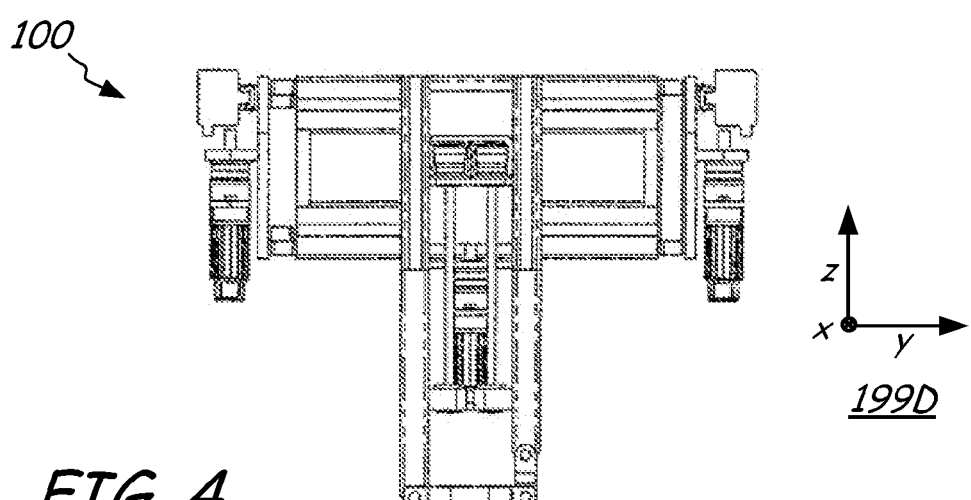
FIG. 4 is a front elevational view of a gantry robot system, according to one illustrative embodiment.
Figure 7A:
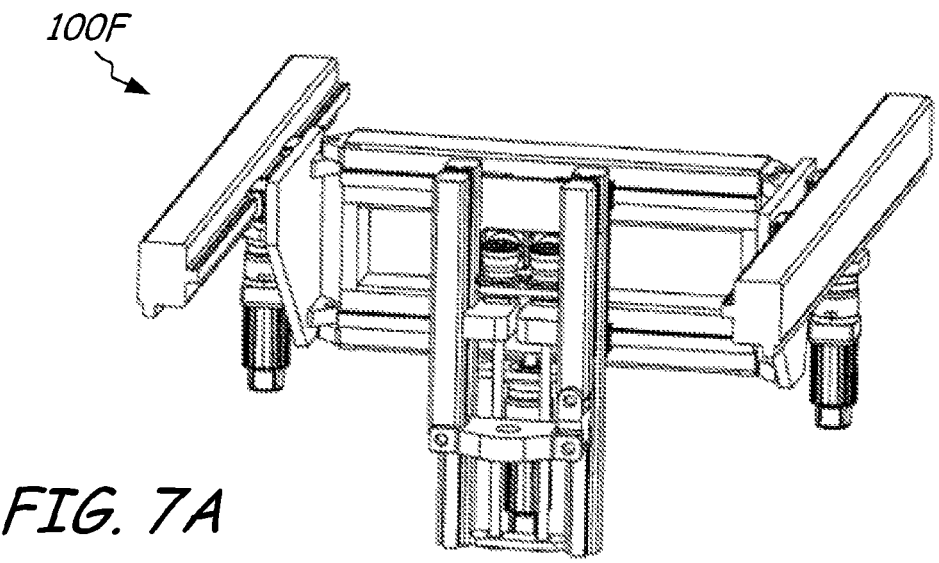
FIG. 7A is a perspective view of a gantry robot system in a vertically retracted state, according to one illustrative embodiment.
Figure 7B:
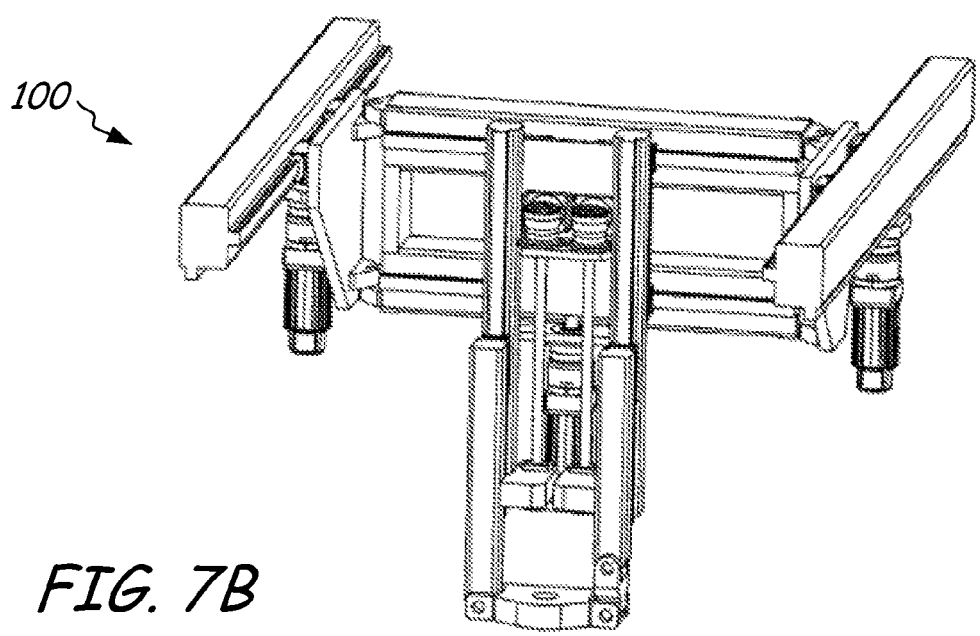
FIG. 7B is a perspective view of a gantry robot system in a vertically extended state, according to one illustrative embodiment.

FIG. 1 depicts a perspective view of a gantry robot system 100, according to one illustrative embodiment. FIGS. 2, 3, and 4 depict top plan, side elevational, and front elevational views of gantry robot system 100, according to the same illustrative embodiment depicted in FIG. 1. Orthogonal reference bases 199A-199D indicate how the orientations of each of FIGS. 1-4 relate to each other, with the positive x, y, and z directions corresponding to the positive longitudinal, lateral, and vertical directions respectively. (In orthogonal reference base 199B, the open circle for z indicates perpendicular to the page upward, while in orthogonal reference base 199C and D, the exed circles for y and x respectively indicate perpendicular to the page downward.)

In this illustrative embodiment, gantry robot system 100 is runway mounted and provides five degrees of freedom consisting of three translational axes and two rotational axes, theta 1 and theta 2. Gantry robot system 100 may incorporate components having a long history of proven performance in the aerospace, marine, and automotive industries.

In this embodiment, gantry robot system 100 may incorporate brushless servomotors for drive units for driving the motions of gantry robot system 100, for example. Any of the motions of the gantry robot system 100 in this or other embodiments, including longitudinal translation, lateral translation, vertical translation, longitudinal rotation, lateral rotation, or vertical rotation, may be provided by any suitable drive units such as pneumatic, hydraulic and/or electric actuators, as well as actuators comprising mechanical gears, screws, etc. In this illustrative embodiment, absolute and independent position feedback may be used on all axes, requiring no homing upon start-up or loss of power. Numerous safety features may be incorporated to protect both gantry robot system 100 and users thereof, including fail-safe brakes and programmable boundaries, for example.

As depicted in the illustrative embodiment of FIG. 1, gantry robot system 100 includes runway beams 101 and 102, skewing bridge assembly 111, carriage assembly 131, and skewing mast assembly 141, and controller 161.

In the illustrative embodiment, linear bearing rail 103 and gear rack 105 are disposed on runway beam 101, and linear bearing rail 104 and gear rack 106 are disposed on runway beam 102. Runway beams 101 and 102 may also include gear-racks, bellows, and leveling devices (not depicted in FIG. 1), for example. Runway beams 101 and 102 may be constructed from rectangular steel tube for high load capacity, for example. Runway beams 101 and 102 have a large cross-section for high rigidity, in this embodiment. If desired, the linear bearings of the rails can be replaced with rollers, wheels or the like. Likewise, gear rack 105 can be replaced with driven wheels, ball screws or other forms of actuator driven mechanisms.

Skewing bridge assembly 111 includes bridge 112, carriage plates 121 and 123, and longitudinal linear drive 125 and a second longitudinal linear drive obscured behind carriage plate 123 in the perspective view of FIG. 1. Longitudinal linear drive 125 is also translatably engaged with gear rack 105 and linear bearing rail 103 of runway beam 101, enabling translational motion of carriage plate 121 along runway beam 101. The longitudinal linear drive (not depicted, but similar to longitudinal linear drive 125) connected to carriage plate 123 is likewise translatably engaged with gear rack 106 and linear bearing rail 104 of runway beam 102, similarly enabling translational motion of carriage plate 123 along runway beam 102. The longitudinal linear drive is one illustrative example of an independently actuable drive. The drive and carriage plate together may be considered parts of a drive assembly. The longitudinal linear drive (as with all drives herein described) can be operated with any of hydraulic, pneumatic and/or electric motion devices such as linear and/or rotary actuators.

Bridge 112 is connected to carriage plate 121 by way of hinge 113, and to carriage plate 123 by way of dual, serially connected hinges 115 and 117, thereby forming a link. In particular, bridge 112 is connected to hinge 115, which in turn is connected to hinge 117, which itself is connected to carriage plate 123. The independently actuable linear drives for carriage plates 123 and 125, together with hinges 113, 115, and 117 are illustrative examples of skewing connectors. Many types of skewing connectors may be used between the bridge 112 and the carriage plates 121, 123 in other embodiments. For example, in various embodiments, linear drives, rotational drives, a serially connected double hinge, and/or a pivoting telescoping mechanism may be used.

With the serially connected double hinge on at least one side, or with a pivoting telescoping mechanism on at least one side, or other mechanisms, the total distance between the connections of bridge assembly 111 with runway beams 101 and 102 may be varied, either shorter when bridge assembly 111 is in a skew-neutral position, or progressively longer as bridge assembly 111 is oriented in positions of higher skew. These skewing connectors are further discussed below.

Skewing bridge assembly 111 may translate back and forth along the runway beams 101 and 102, which define a longitudinal or x-axis direction. Bridge 112 may be constructed from rectangular steel tube for high load capacity, in this embodiment. Drive units for the carriage assembly 131, skewing mast assembly 141, and bridge assembly 111 may all be mounted to bridge assembly 111, in this illustrative embodiment.

Hinges 113, 115, and 117 and their associated linear drive units may serve as skewing connectors for the skewing bridge assembly 111, and may incorporate independent rack and pinion systems. Longitudinal translating motion of skewing bridge assembly 111 may be achieved by moving the linear longitudinal linear drive 125, associated with hinge 113, and the longitudinal linear drive associated with hinge 117 in unison. These two longitudinal linear drives may also be engaged out of unison to achieve longitudinal rotation, or longitudinal skewing (i.e. rotational skewing), which may also be referred to as the theta 1 axis or a yaw axis, with rotation engaged in hinges 113, 115, and 117.

In this illustrative embodiment, in each of the longitudinal linear drives, a servomotor, gear head, and output pinion may engage a precision aligned gear rack, providing tight backlash control. High precision, pre-loaded, cross roller linear way bearings may ensure maximum mobility of linear axes under high lateral and overturning loads. An absolute encoder located at the back of the servomotor may sense position. Grease zerks may be provided on the bridge bearings. The gear reducers may be sealed units requiring periodic lubrication, in this illustrative embodiment.

Longitudinal skewing of bridge assembly 111 is depicted in FIGS. 5B and 5C, relative to the longitudinally neutral or unskewed position of bridge assembly 111 as depicted in FIG. 5A. FIG. 5C shows the bridge assembly 111 skewed in a positive longitudinal orientation, while FIG. 5B shows the bridge assembly 111 skewed in a negative longitudinal orientation. As depicted, the link connection between dual serially connected hinges 115 and 117 may extend to allow the greater displacement between the connection points between bridge assembly 111 and runway beams 101 and 102 when bridge assembly 111 is put into a skewed orientation. The longitudinal linear drives and hinges 113, 115, and 117 may therefore provide bridge assembly 111 with a robust and precise mode of longitudinally rotational motion where single and/or dual motions of the carriages can realize a theta 1 or yaw rotation about a stationary or moving virtual axis selectively located between the runway beams 101 and 102.

Different ranges of rotational motion may be provided depending on the specifications of bridge assembly 111 and hinges 113, 115, and 117. For example, in the illustrative embodiment of FIG. 1 bridge assembly 111 may be configured with a rotational range of plus or minus ten degrees from the neutral position. Other rotational ranges with a lesser or greater maximum angle of rotation may be provided in other embodiments.

Carriage assembly 131 may illustratively include a rack and pinion drive system in this embodiment. Carriage assembly 131 includes vertical beams 133 and 135 with linear bearing rails that support skewing mast assembly 141. Skewing mast assembly 141 includes mast tubes 143, 145 that each translatably engage vertical beams 133 and 135 respectively. Carriage assembly 131 may illustratively include motors 137 as a drive unit for the skewing mast assembly 141, for example. The motors 137 can be hydraulic, pneumatic and/or electrically operated.

In this illustrative embodiment, the carriage assembly 131 translates back and forth along bridge 112, defining a lateral or y-axis direction. Carriage assembly 131 may be constructed from steel tube for high load-bearing capacity. Analogously in certain respects to bridge assembly 111, the drive system for the carriage assembly 131 may include ball screws or a rack and pinion system, or other forms of actuating devices such as hydraulic, pneumatic and electric actuators to name just a few. A servomotor, gear head, and output pinion engage a precision aligned gear rack for tight backlash control. High precision, pre-loaded, cross roller linear way bearings may ensure maximum mobility of linear axes under high lateral and overturning loads. An absolute encoder located at the back of the servomotor may sense position. Grease zerks may be provided on the bridge bearings. The gear reducers may be sealed units requiring periodic lubrication, in this illustrative embodiment.

Skewing mast assembly 141 may include a dual ball screw drive system. Skewing mast assembly 141 also includes end effector mount 151, which is connected to mast tube 143 by way of hinge 153, and to mast tube 145 by dual serially connected hinges 157 and 155 forming a link, where again if desired a pivoting telescoping mechanism could also be used. That is, end effector mount 151 is connected to hinge 157, which in turn is connected to hinge 155, which itself is connected to mast tube 145. The independently actuable ball screws of mast tubes 143, 145, together with hinges 153, 155, and 157 are illustrative examples of skewing connectors. Many other types of skewing connectors may be used between the mast tubes 143, 145 and the end effector mount 151 in other embodiments. These skewing connectors are also further discussed below.

Analogously to skewing bridge assembly 111, skewing mast assembly 141 may translate up and down along the vertical beams 133 and 135, which define a vertical or z-axis direction, while supporting end effector mount 151 and any payload carried by end effector mount 151. Mast tubes 143 and 145 may both be independently translatable along their respectively engaged vertical beams 133 and 135, by means of their own ball screws. Vertical translational motion may be achieved by moving both balls screws together, moving both mast tubes 143 and 145 in unison and level with each other during translation up or down vertical beams 133 and 135. Vertical rotational motion, or skewing around the theta 2 axis, may also be achieved by engaging the drive units of mast tubes 143 and 145 out of unison and moving mast tubes 143 and 145 relative to each other, to achieve vertical rotation, or vertical skewing, which may also be referred to as the theta 2 axis or a roll axis, where single and/or dual motions of the masts tubes can realize a theta 2 or roll rotation about a stationary or moving virtual axis selectively located between the mast tubes 143 and 145.

Vertical skewing of mast assembly 141 is depicted in FIGS. 6B and 6C, relative to the vertically neutral or unskewed position of mast assembly 141 as depicted in FIG. 6A. FIG. 6B shows the mast assembly 141 skewed in a positive vertical orientation, while FIG. 6C shows the mast assembly 141 skewed in a negative vertical orientation. As depicted, the connection between hinges 155 and 157 may extend to allow the greater displacement between the connection points between end effector mount 151 and mast tubes 143 and 145 when mast assembly 141 is put into a skewed orientation. The drive unites of mast assembly 141 together with hinges 153, 155, and 157 may therefore provide mast assembly 141 with a robust and precise mode of vertically rotational motion.

Different ranges of rotational motion may be provided depending on the specifications of mast assembly 141 and its drive units, and the dimensions of hinges 153, 155, and 157. For example, in the illustrative embodiment of FIG. 1, mast assembly 141 may be configured with a rotational range of plus or minus ten degrees from the neutral position. Other rotational ranges with a lesser or greater maximum angle of rotation may be provided in other embodiments.

Controller 161 may be communicably connected to all drive units, actuable components, displacement sensors or other elements of gantry robot system 100 by means of input lines 163 and output lines 165, which are schematically represented in FIG. 1, and which could include any suitable wired or wireless and direct or network connection. Controller 161 may incorporate any type of suitable computer hardware and/or software, networking hardware and/or software, and/or any other type of controller. Controller 161 and its associated input/output lines 163, 165 are not limited to any form or position depicted in their schematic representation in FIG. 1, but may take any form and position consonant with their proper function.

In another illustrative embodiment, for example, additional structures may be used to provide for lateral rotation or pitch skew (about a stationary or moving virtual axis that is perpendicular to the yaw and roll axes mentioned above), in addition to longitudinal and vertical rotation or yaw and roll skew. Other embodiments may include any combination of longitudinal, lateral, and vertical translation and longitudinal, lateral, and vertical rotation, and/or other degrees of freedom.

According to an illustrative embodiment, all electrical cables may be made with MILSPECS-type connectors and may be protected either encased in a flexible conduit, or enclosed in the various assemblies. The brushless servomotors may have permanently lubricated and sealed bearings. Reducer gearboxes may be flooded with oil and sealed for the service life of the lubricant.

According to an illustrative embodiment, the design of linear and rotational axis drive assemblies may ensure maximum speed and power efficiency under high loads, while maintaining quiet operation and excellent repeatability. These features contribute to the superior performance characteristics of the robot in positioning heavy payloads.

According to an illustrative embodiment, safety features for human and machine protection are integrally designed into the robot locomotion and control system. Axis brakes may be designed to set in the absence of power, thereby ensuring that a power failure will not cause a brake failure. Low control voltages throughout the robot electrical system help safeguard personnel from potential shock hazards caused by equipment damage or human misjudgment. Standard emergency stop (E-STOP) switches on the operator panel and teach pendant provide an emergency shutdown mechanism for halting the robot in the event of possible equipment damage or injury to personnel. Additional E-STOP switches may optionally be provided via a terminal strip located in the robot junction box. Expandable, standard industrial I/O may provide ample signal and control paths for additional sensing, safety and control circuits.

A robot gantry system as disclosed herein thereby provides a system that is capable of both a plurality of translational axes of motion and a plurality of rotational axes of motion.

Figure 8:
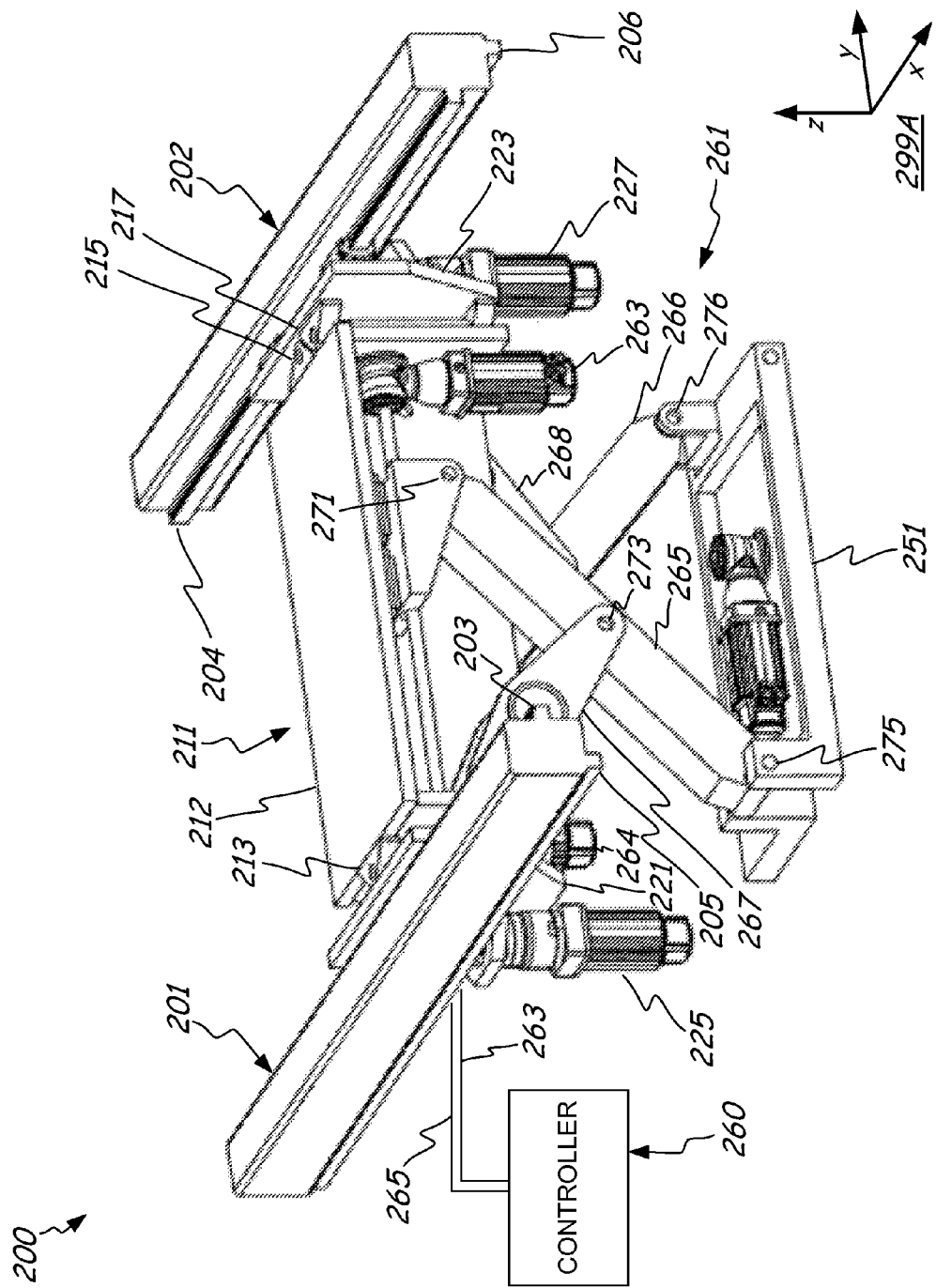
FIG. 8 is a perspective view of a gantry robot system, according to a second illustrative embodiment.

Another illustrative embodiment of a gantry robot system is depicted in FIGS. 8 through 14B. FIG. 8 depicts a perspective view of a gantry robot system 200, according to one illustrative embodiment. Gantry robot system 200 includes certain features that are identical or similar to those of gantry robot system 100 of FIGS. 1 through 7B, while also including a different mechanism for enabling vertical motion, involving scissoring carriage assembly 261.

Figure 9:
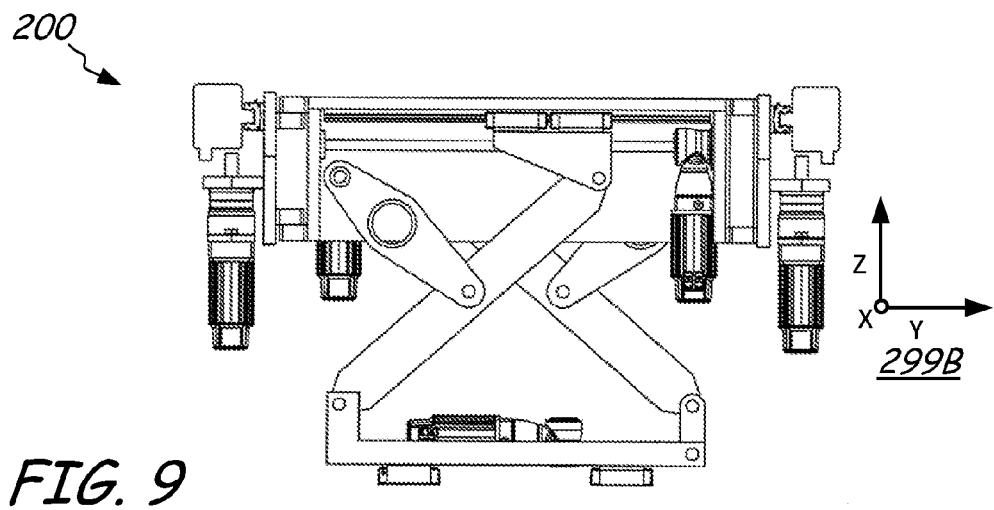
FIG. 9 is a front elevational view of a gantry robot system, according to the second illustrative embodiment.
Figure 10:
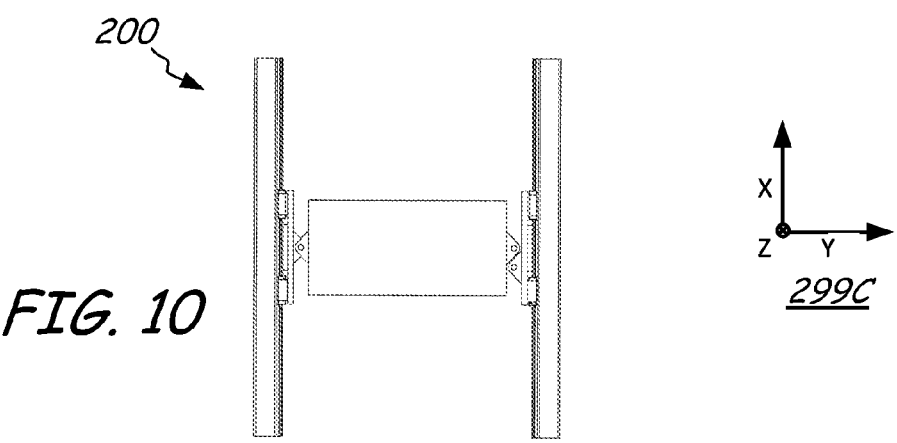
FIG. 10 is a top plan view of a gantry robot system, according to the second illustrative embodiment.
Figure 11:
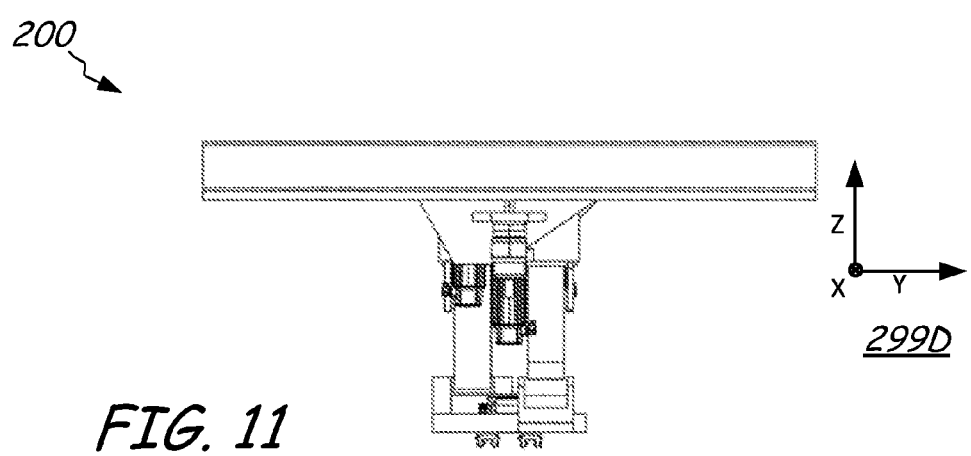
FIG. 11 is a side elevational view of a gantry robot system, according to the second illustrative embodiment.

FIGS. 9, 10, and 11 depict front elevational, top plan, and side elevational views of gantry robot system 200, according to the same illustrative embodiment depicted in FIG. 8. Orthogonal reference bases 299A-299D indicate how the orientations of each of FIGS. 8-11 relate to each other, with the positive x, y, and z directions corresponding to the positive longitudinal, lateral, and vertical directions respectively. (In orthogonal reference base 299B, the open circle for z indicates perpendicular to the page upward, while in orthogonal reference bases 299C and D, the exed circles for y and x respectively indicate perpendicular to the page downward.)

In this illustrative embodiment, gantry robot system 200 also provides five degrees of freedom consisting of three translational axes and two rotational axes, theta 1 and theta 2. The rotational axes of freedom are depicted in FIGS. 12A-C and 13A-C, described below.

As depicted in the illustrative embodiment of FIG. 8, gantry robot system 200 includes runway beams 201 and 202, bridge assembly 211, scissoring carriage assembly 261, and controller 260. Similar to those of FIG. 1, runway beams 201 and 202 have linear bearing rails 203, 204 and gear racks 205, 206 disposed on them, respectively, and runway beams 201 and 202 may also include the features and/or aspects discussed above with reference to runway beams 101 and 102.

Bridge assembly 211 is broader than bridge assembly 111 of FIG. 1, and includes bridge 212, carriage plates 221 and 223, and longitudinal linear drives 225 and 227. Longitudinal linear drive 225 is also translatably engaged with gear rack 205 and linear bearing rail 203 of runway beam 201, enabling translational motion of carriage plate 121 along runway beam 201. Longitudinal linear drive 227 is likewise translatably engaged with gear rack 206 and linear bearing rail 204 of runway beam 203, similarly enabling translational motion of carriage plate 223 along runway beam 202.

Bridge assembly 211 thereby enables longitudinal skewing, as depicted in FIGS. 12A-C, and analogously to the embodiment of gantry robot system 100. FIG. 12A shows gantry robot system 200 in a state without longitudinal skew, while FIG. 12B shows gantry robot system 200 in state 200B with positive longitudinal skew (or labeled as positive according to the right-hand rule with upward defined as positive on the vertical axis of rotation), i.e. counterclockwise longitudinal skew in the view depicted in FIG. 12B; and FIG. 12C shows gantry robot system 200 in state 200C with negative or clockwise longitudinal skew. This longitudinal skewing provides a longitudinal rotational axis, with longitudinal rotation about a vertical axis. The longitudinal rotation may be done about an axis of rotation that is either at the center of bridge assembly 211, or at an off center position. FIGS. 12A-C also show bridge assembly 211 connected to runway beams 201, 202 by a single hinge 213 on one side and dual, serially connected hinges 215 and 217 on the other side, in an illustrative embodiment of skewing connectors analogous to those of robot gantry system 100 as discussed above.

Scissoring carriage assembly 261 herein is suspended from bridge assembly 211; however in another embodiment, the carriage assembly 261 can be directly coupled to beams 201, 202. Scissoring carriage assembly 261 includes lateral linear drive 263, diagonal link 265, and scissoring linkage 267 visible in the foreground as depicted in FIG. 8, as well as a corresponding set of lateral linear drive (obscured from view in FIG. 8), diagonal link 266, and scissoring linkage 268, in the background as depicted in FIG. 8, as well as effector mount 251.

Diagonal link 265 is rotatably connected to lateral linear drive 263 by hinge 271, to scissoring linkage 267 by hinge 273, and to effector mount 251 by hinge 275, thereby constraining the motion of diagonal link 265 to translate lateral motion of lateral linear drive 263 into vertical motion of effector mount 251 at hinge 275. A proximal end of diagonal link 265 is rotatably engaged with lateral linear drive 263, while a distal end of diagonal link 265 is rotatably engaged with effector mount 251. The opposing diagonal link 266 is similarly rotatably attached to its corresponding lateral linear drive and to its scissoring linkage 268 by corresponding hinges and to effector mount 251 by hinge 276.

Figure 14A:
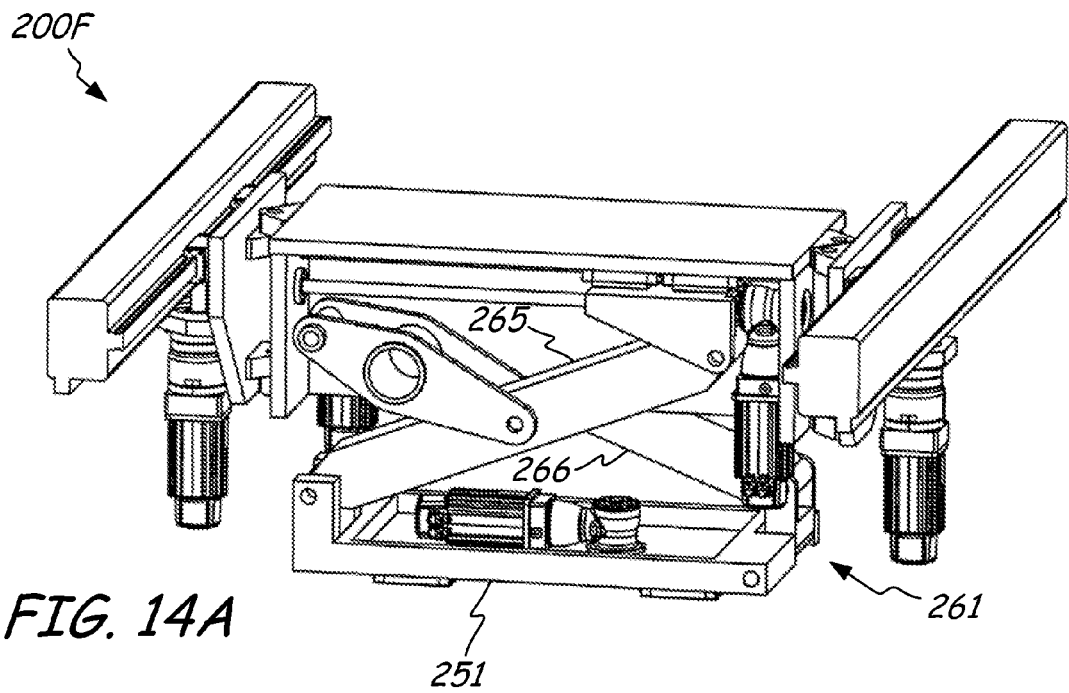
FIG. 14A is a perspective view of a gantry robot system in a vertically retracted state, according to the second illustrative embodiment.
Figure 14B:
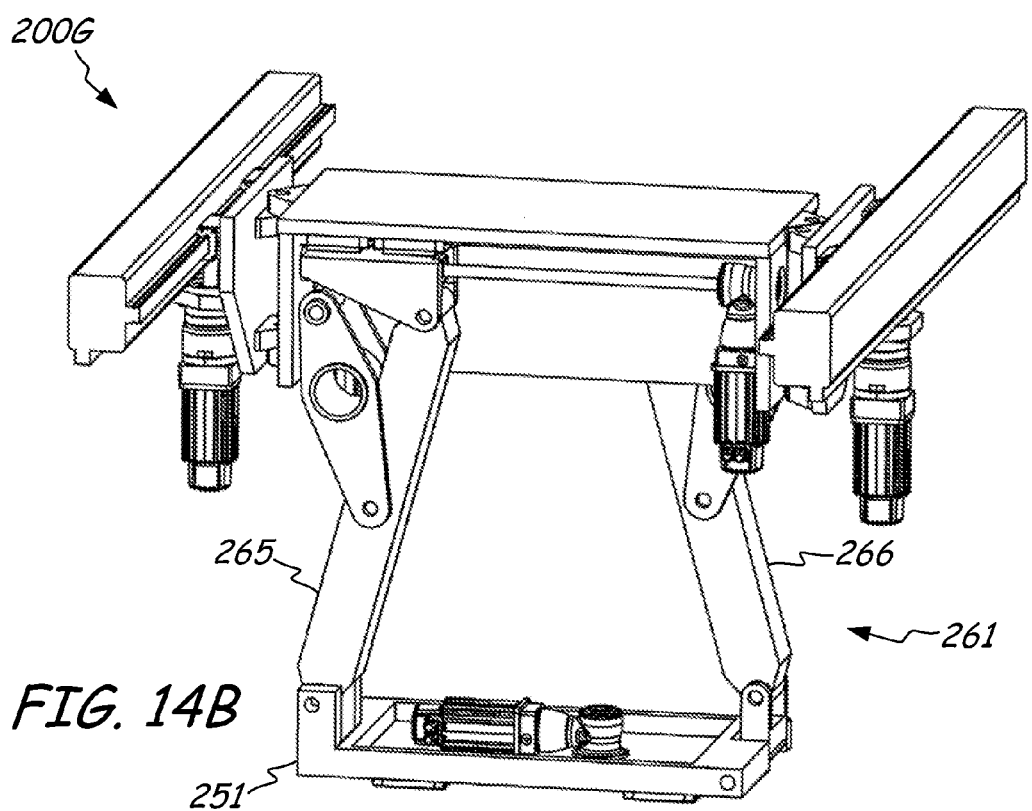
FIG. 14B is a perspective view of a gantry robot system in a vertically extended state, according to the second illustrative embodiment.

Scissoring carriage assembly 261 is thereby enabled to provide lateral and/or vertical motion to effector mount 251, in particular, lateral motion when the lateral linear drives both translate in the same direction, and vertical motion when the lateral linear drives each translate in opposing directions. This vertical motion is depicted in FIGS. 14A and 14B. FIG. 14A shows gantry robot system 200 in state 200E in which both diagonal links 265, 266 are fully retracted, positioning effector plate 251 at its vertically highest position. FIG. 14B shows gantry robot system 200 in state 200F in which both diagonal links 265, 266 are fully extended, positioning effector plate 251 at its vertically lowest position.

Scissoring carriage assembly 261 also enables vertical skewing of effector plate 251, by translation of one of the lateral linear drives that is not matched by the other of the lateral linear drives. This is depicted in FIGS. 13B and 13C. FIG. 13B shows gantry robot system 200D in a state of negative vertical skew, i.e. clockwise vertical skew in the view depicted in FIG. 13B, and FIG. 13C shows gantry robot system 200E in a state of positive vertical skew, i.e. counter-clockwise vertical skew in the view depicted in FIG. 13C, in contrast with FIG. 13A, which depicts gantry robot system 200 in a neutral state, without vertical skew. FIG. 13B further shows lateral linear drive 263 at a position that is less extended than lateral linear drive 264, which translates to diagonal link 265 being less vertically extended than diagonal links 266, causing the clockwise skewing of effector plate 251.

This vertical skewing provides a vertical rotational axis, with vertical rotation about a longitudinal axis. The vertical rotation may be done about an axis of rotation that is either at the center of effector plate 251, or at an off center position.

Scissoring carriage assembly 261 also provides certain advantageous features, such as maintaining the center of mass of effector plate 251 directly aligned with the vector of the structural retaining force between the effector plate 251 and the bridge assembly 211, and the vector of the net force applied to effector plate 251 by scissoring carriage assembly 261 during vertical motion, as long as any associated load also has its center of mass vertically aligned with that of the effector plate 251. This prevents effector plate 251 and any associated load from having a non-vertical moment of inertia or from exerting an associated longitudinal torque on scissoring carriage assembly 261.

It should be noted that if desired, the carriage assembly 261 can include a support that is translatable on the bridge 211 in a manner, for example, similar to how beams 133 and 135 are translatable on bridge 111. The support in turn can carry the carriage assembly 261. In this manner, more lateral motion can be provided for end effector plate 251.

It should also be understood that a gantry system need not have both a skewing bridge assembly and a skewing carriage assembly.

Figure 15:
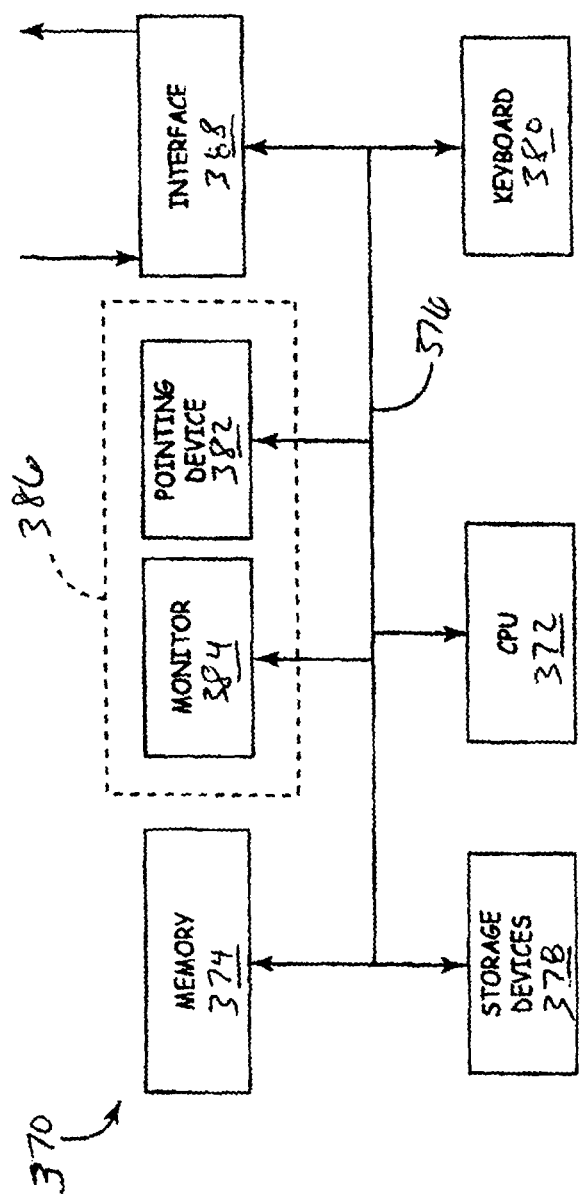
FIG. 15 is a schematic illustration of a computing environment.

At this point it should be noted the controller 161 or 260 each can be implemented on one or more digital and/or analog computers. FIG. 15 and the related discussion provide a brief, general description of a suitable computing environment for the controller 161 or 260. Although not required, the controller 161 or 260 can be implemented at least in part, in the general context of computer-executable instructions, such as program modules, being executed by a computer 370. Generally, program modules include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the invention may be practiced with other computer system configurations, including multi-processor systems, networked personal computers, mini computers, main frame computers, and the like. Aspects of the invention may also be practiced in distributed computing environments where tasks are performed by remote processing devices that are linked through a communications network. In a distributed computer environment, program modules may be located in both local and remote memory storage devices.

The computer 370 illustrated in FIG. 15 comprises a conventional computer having a central processing unit (CPU) 372, memory 374 and a system bus 376, which couples various system components, including memory 374 to the CPU 372. The system bus 376 may be any of several types of bus structures including a memory bus or a memory controller, a peripheral bus, and a local bus using any of a variety of bus architectures. The memory 374 includes read only memory (ROM) and random access memory (RAM). A basic input/output (BIOS) containing the basic routine that helps to transfer information between elements within the computer 370, such as during start-up, is stored in ROM. Storage devices 378, such as a hard disk, a removable data storage device, an optical disk drive, etc., are coupled to the system bus 376 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 374 from at least one of the storage devices 378 with or without accompanying data.

Input devices such as a keyboard 380 and/or pointing device (mouse) 382, or the like, allow the user to provide commands to the computer 370. A monitor 384 or other type of output device is further connected to the system bus 376 via a suitable interface and provides feedback to the user. If the monitor 384 is a touch screen, the pointing device 382 can be incorporated therewith. The monitor 384 and typically an input pointing device 382 such as mouse together with corresponding software drivers form a graphical user interface (GUI) 386 for computer 370. Interfaces 388 on each of the system controller 60 allow communication between controller 161 or 260 elements of the gantry system such as a separate controller used to provide command signals that for drive elements (motor controllers, servo valves, etc.) of the gantry system to cause manipulation thereof. Interfaces 88 can also represent circuitry used to send signals to or receive signals to such controller(s) or directly to the actuators and/or sensing devices (e.g. contact sensors to measure the reference positions and remote positions, pressure sensors, etc.) as mentioned above. Commonly, such circuitry comprises digital-to-analog (D/A) and analog-to-digital (A/D) converters as is well known in the art. In another computing environment, the controller 161 or 260 and each of the various other controllers is a single board computer operable on a network bus of another computer, such as a supervisory computer. The schematic diagram of FIG. 15 is intended to generally represent these and other suitable computing environments.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A gantry robot system comprising:
a first beam;
a second beam;
a bridge assembly spanning and supported by the first beam and the second, the bridge assembly comprising a bridge, a first connector connected to the bridge and a second connector connected to the bridge, a first drive connected to the first connector and configured to displace the first connector longitudinally relative to the first beam, and a second drive connected to the second connector and configured to displace the second connector longitudinally relative to the second beam, wherein at least one of the first connector and/or the second connector comprises a link pivotally connected to the bridge assembly to pivot about a first pivot axis and pivotally connected to one of the first and second drive to pivot about a second pivot axis, wherein each of the first pivot axis and the second pivot axis are orthogonal to elongation of the first beam and orthogonal to the elongation of the bridge spanning the first beam and the second beam, and the first drive and the second drive are independently actuable, thereby enabling the bridge assembly to be rotationally skewed relative to the first and second beams; and a carriage assembly suspended from the bridge.

2. The gantry robot system of claim 1, in which the first drive is movably joined to the first beam to move thereon and the second drive is movably joined to the second beam to move thereon.

3. The gantry robot system of claim 1, in which the first connector comprises a hinge connecting the bridge to the first drive, and in which the second connector comprises the link connecting the bridge to the second drive.

4. The gantry robot system of claim 1, in which the first drive and the second drive comprise servomotors.

5. The gantry robot system of claim 4, in which the servomotors are brushless servomotors.

6. The gantry robot system of claim 1, in which the first beam and the second beam each comprise a bearing rail and a gear rack, and the first drive is engaged with the bearing rail and the gear rack of the first beam, and the second drive is engaged with the bearing rail and the gear rack of the second beam.

7. The gantry robot system of claim 1, in which the carriage assembly further comprises a first carriage assembly drive, moveably engaged with the bridge, thereby enabling translation of the carriage assembly in a lateral direction along the bridge.

8. The gantry robot system of claim 7, in which the carriage assembly further comprises a first vertical beam and a second vertical beam, and the gantry robot system further comprises a mast assembly suspended from the carriage assembly, the mast assembly comprising an effector plate, a first plate connector and a second plate connector connected to the effector plate, an independently actuable first mast assembly drive connected to the first plate connector, and an independently actuable second mast assembly drive connected to the second plate connector, the first mast assembly drive being moveably engaged with the first vertical beam and the second mast assembly drive being moveably engaged with the second vertical beam, and at least one of the first plate connector or the second plate connector is an extendible plate connector, thereby enabling translation of the mast assembly in a vertical direction along the first vertical beam and the second vertical beam and rotational skewing of the effector plate about a longitudinal axis.

9. The gantry robot system of claim 8, in which the extendible plate connector comprises dual, serially connected hinges.

10. The gantry robot system of claim 7, in which the carriage assembly further comprises a second carriage assembly drive, a first diagonal link and a second diagonal link, and an effector plate, in which the second carriage assembly drive is moveably engaged with the bridge, the first and second carriage assembly drives are independently actuable, the first diagonal link is rotatably engaged at a proximal end thereof with the first carriage assembly drive and at a distal end thereof with a first plate connector, and the second diagonal link is rotatably engaged at a proximal end thereof with the second carriage assembly drive and at a distal end thereof with a second plate connector, the effector plate being engaged by the first and second plate connectors, in which at least one of the first and second plate connectors is an extendible plate connector, thereby enabling translation of the effector plate in a vertical direction and rotational skewing of the effector plate about a longitudinal axis.

11. The gantry robot system of claim 10, in which the extendible plate connector comprises dual, serially connected hinges.

12. The gantry robot system of claim 1, in which the first drive and the second drive comprise pneumatic actuators.

13. The gantry robot system of claim 1, in which the first drive and the second drive comprise hydraulic actuators.

14. The gantry robot system of claim 1, in which the first drive and the second drive comprise electric actuators.

15. A gantry robot system comprising:
a first longitudinal beam and a second longitudinal beam extending along a longitudinal axis;
an end effector plate;
a bridge support; and
a carriage assembly coupled to the bridge support and supported by the first and second longitudinal beams, the carriage assembly including first and second carriage assembly drives mounted to the bridge support, and first and second diagonal links, in which the first and second carriage assembly drives are independently actuable, the first diagonal link is rotatably engaged at a proximal end thereof with the first carriage assembly drive and at a distal end thereof with the end effector plate, and the second diagonal link is rotatably engaged at a proximal end thereof with the second carriage assembly drive and at a distal end thereof with the end effector plate, a third link having a proximal end connected to the bridge support with a first hinge and a distal end connected to the first diagonal link with a second hinge, a fourth link having a proximal end connected to the bridge support with a third hinge and a distal end connected to the second diagonal link with a fourth hinge, and wherein selective actuation of the first and second carriage assembly drives causes vertical displacement and/or rotational skewing of the effector plate about the longitudinal axis.

16. The gantry robot system of claim 15, in which the distal end of the third link is connected to the first diagonal link between the proximal and distal ends, and in which the distal end of the fourth link is connected to the second diagonal link between the proximal and distal ends.

17. The gantry robot system of claim 16, in which the first and second diagonal links extend in different directions.

18. The gantry robot system of claim 17, in which the first carriage drive assembly comprises a linear drive having a first driven element connected to the first diagonal link, and in which the second carriage drive assembly comprises a second linear drive having a second driven element connected to the second diagonal link.

19. The gantry robot of claim 18, in which the first and second linear drives are configured on the bridge such that movement of the first driven element and the second driven element in the same direction causes rotational skewing of the effector plate about the longitudinal axis.

20. The gantry robot of claim 19, in which the bridge support is movably joined to the first and second longitudinal beams to move in a direction parallel to the longitudinal axis.

* * * * *